(No Model.)
K. O. SLOSKY.
THERMIC FIRE ALARM.
No. 591,700. Patented Oct. 12, 1897.
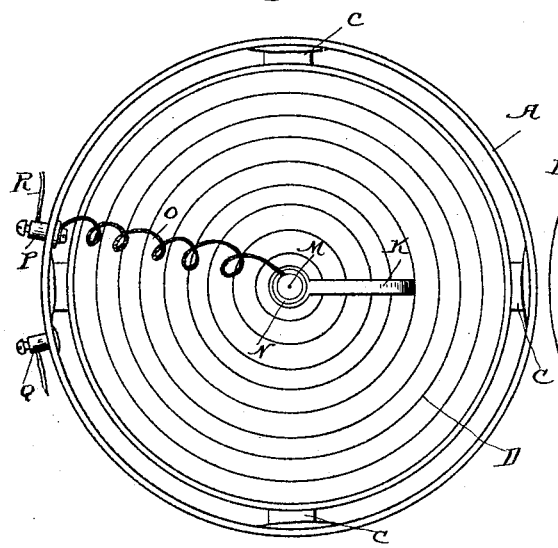
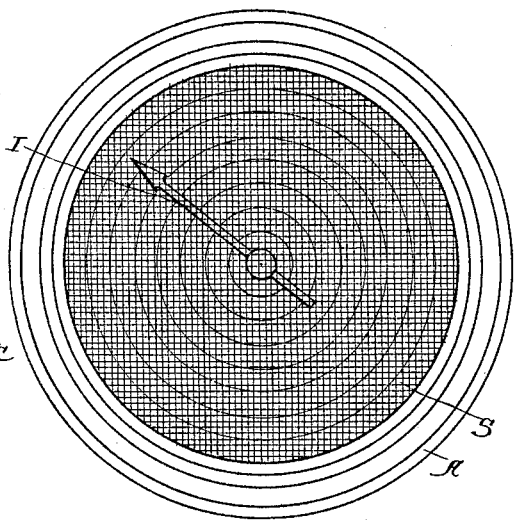
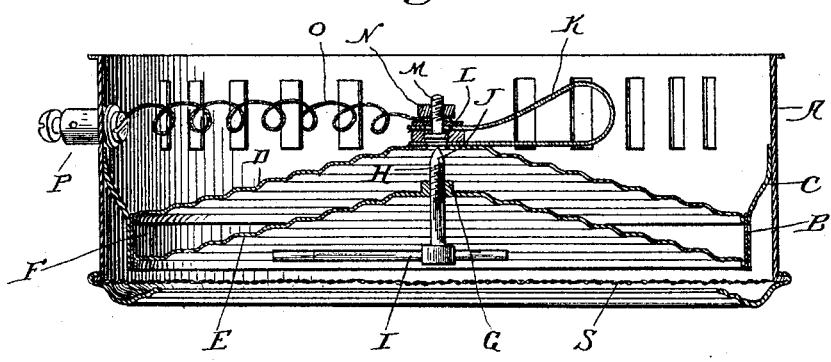
Witnesses:
H. B. Hallock.
J. O. Williamson.
Inventor:
Konstanty O. Slosky.
By Geo. H. Holgate
Attorney.

UNITED STATES PATENT OFFICE.

KONSTANTY O. SLOSKY, OF PHILADELPHIA, PENNSYLVANIA.

THERMIC FIRE-ALARM.

SPECIFICATION forming part of Letters Patent No. 591,700, dated October 12, 1897.

Application filed June 5, 1897. Serial No. 639,509. (No model.)

*To all whom it may concern:*

Be it known that I, KONSTANTY O. SLOSKY, a subject of the Czar of Russia, residing at Philadelphia, in the county of Philadelphia and State of Pennsylvania, have invented a new and useful Improvement in Thermic Fire-Alarms, of which the following is a specification.

My invention relates to a new and useful improvement in thermic fire-alarms, and has for its object to provide a simple, cheap, and effective device which may be secured in any suitable location, preferably upon the ceiling of a room, and when so secured and properly connected electrically will cause a gong or other alarm to be sounded when the temperature at the upper portion of said room is unduly increased.

With these ends in view this invention consists in the details of construction and combination of elements hereinafter set forth, and then specifically designated by the claims.

In order that those skilled in the art to which this invention appertains may understand how to make and use the same, the construction and operation will now be described in detail, referring to the accompanying drawings, forming a part of this specification, in which—

Figure 1 is a plan view of my invention prior to its attachment to the ceiling; Fig. 2, a bottom plan thereof; and Fig. 3, a central cross-section illustrating the arrangement of the contact-points and electric connection.

In carrying out my invention as here embodied I provide a casing A, which may be of any suitable design, but preferably of ring shape, and this casing is adapted to be secured to the ceiling or other suitable surface and is open both at the top and bottom. Within the casing is located the circuit-controller B, which is here shown as circular and held in place by means of the straps C, attached thereto and to the inner walls of the casing, either by soldering or otherwise, and this controller consists of two concave-convexo disks D and E, each of which is corrugated, as clearly shown, and secured together by the circular band F. A small boss G is secured upon the center of the disk E, upon the inside thereof, and this boss is threaded, after the manner of a nut, and adapted to receive the contact-screw H, which latter has a cross-bar I secured to the head thereof, in order that it may be manipulated in adjusting its point J. A spring arm or bracket J is secured to the center of the disk D, upon the upper side thereof, and extending outward is bent backward upon itself and terminates above the center of this disk and has secured therein the insulated contact-point L by means of the threaded shank M of said contact-point, which latter has a nut N run thereon for that purpose. The nut N is also utilized for securing the conducting-wire O in electrical contact with the nut and shank, while the outer end of this wire is attached to the insulated binding-post P, and the binding-post Q is also secured to the casing, which serves as a return or ground connection, the casing being in electrical connection with the disks.

From this description the operation of my improvement will be obviously as follows: The casing being secured in position upon the ceiling and the post P having secured thereto the battery-wire R, while the post Q is connected with ground or a return wire, any undue rise in temperature within the room will of necessity be first made most apparent at the ceiling, and this will raise the temperature of the disk E, which, on account of its peculiar shape and the corrugations formed therein, will be so expanded as to cause its center to move upward, carrying with it the contact-screw H, the point J of which will be thereby forced into contact with the point L, thus closing the circuit and causing the sounding of the alarm which is included within said circuit.

It has been found by experiment that the sounding of the alarm may be so accurately determined by the proper adjustment of the screw H as to cause it to sound upon a rise of temperature to the extent of a few degrees; but of course in practice the sounding of the alarm should be brought about only upon an undue rise in temperature, thus permitting lights and heat to be used in the room without affecting the alarm.

The disk E, being directly exposed to the heat, will expand, while disk D, being protected by the plate E and the air intervening, will not be acted on by the heat to any appreciable extent. The disk E may be protected from contact or injury by a wire screen S, covering the lower opening of the casing, and this arrangement will in nowise interfere with the free passage of the heated air of the room to the disk, and thus not affect the operations of the device.

It is preferable in practice that the major parts of the device be made of zinc; but of course this may be varied to suit the particular requirements of the manufacturer or user.

Having thus fully described my invention, what I claim as new and useful is—

1. A thermic fire-alarm consisting of two concave-convexo disks having their surfaces corrugated, contact-points carried by said disks, and an electric circuit in which the alarm is included, as specified.

2. In combination, a casing, two concave-convexo disks secured together and located therein, an adjustable contact-point carried by one of the disks, a spring contact-point carried by the other disk, and an electric circuit in which the alarm is included, as specified.

3. The herein-described combination of the casing A, the disks D and E, each of which is concave-convexo and corrugated, an adjustable contact-point carried by the disk E, a spring-controlled contact-point carried by the disk D, and an electric circuit in which the alarm is included, substantially as and for the purpose set forth.

4. In combination with a fire-alarm of the character described, two concave-convexo corrugated disks so arranged relative to each other and within a casing as to cause the contact-point carried by one of said disks to move to a greater distance than the contact-point carried by the other disk when heat is imparted to the device, substantially as shown and described.

In testimony whereof I have hereunto affixed my signature in the presence of two subscribing witnesses.

KONSTANTY O. SLOSKY.

Witnesses:
S. S. WILLIAMSON,
SAMUEL L. TAYLOR.